United States Patent [19]

Hoesslin et al.

[11] 4,389,366

[45] Jun. 21, 1983

[54] PROCESS AND DEVICE FOR COOLING HOLLOW SYNTHETIC MATERIAL PROFILES

[75] Inventors: Gerhard V. Hoesslin, Düsseldorf; Jurgen Hesse, Schorndorf, both of Fed. Rep. of Germany

[73] Assignee: Messer Griesheim GmbH, Fed. Rep. of Germany

[21] Appl. No.: 300,935

[22] Filed: Sep. 10, 1981

[51] Int. Cl.³ .................................................. B29F 3/08
[52] U.S. Cl. .................................... 264/558; 264/565; 264/209.1; 264/237; 425/71; 425/72 R; 425/326.1; 425/378 R
[58] Field of Search ...................... 264/209.1, 28, 237, 264/564, 565, 566, 562, 519, 558; 425/378 R, 379 R, 326.1, 71, 72 R

[56] References Cited

U.S. PATENT DOCUMENTS

| 3,129,461 | 4/1964 | Zavasnik et al. | 425/379 R |
| 3,195,184 | 7/1965 | Svec | 425/378 |
| 4,069,282 | 1/1978 | Gutermuth et al. | 264/28 |
| 4,088,724 | 5/1978 | Kuhnert | 264/28 |
| 4,190,473 | 2/1980 | Soecknick et al. | 264/28 |
| 4,212,171 | 7/1980 | Soecknick | 264/28 |

FOREIGN PATENT DOCUMENTS

| 2405809 | 6/1979 | France | 264/237 |
| 1123318 | 8/1968 | United Kingdom | 264/558 |

Primary Examiner—Jeffery R. Thurlow
Attorney, Agent, or Firm—Connolly and Hutz

[57] ABSTRACT

A hollow synthetic profile is cooled during extrusion by direct heat exchange through the introduction of undercooled liquid nitrogen under a pressure of 2 to 8 bar into the hollow interior by means of a boring in the arbor of the extrusion tool with an insulated capillary tube forming the cooling medium line.

7 Claims, 4 Drawing Figures

PROCESS AND DEVICE FOR COOLING HOLLOW SYNTHETIC MATERIAL PROFILES

BACKGROUND OF INVENTION

The invention concerns a process and a device for the cooling of hollow synthetic material profiles during extrusion by means of direct heat exchange with a cooling medium.

The hollow synthetic material profiles, e.g., window profiles of thermoplastics, are not possible to cool conventionally from the inside due to the small cross-sections. With outside calibration and cooling with water from the outside, the rate of cooling, and consequently also the extrusion rate, will be limited.

SUMMARY OF INVENTION

An object of the invention is to create a process which makes inside cooling of hollow synthetic material profiles possible during extrusion, while permitting higher extrusion rate through uniform cooling.

In accordance with this invention, under-cooled liquid nitrogen under a pressure of 2 to 8 bar is introduced through an insulated capillary tube in the arbor of the extrusion tool into the hollow interior of the extruded profile.

Liquid nitrogen is known to be a cooling medium with intensive effect. However, due to the small cross-sections of the hollow body tools, it did not seem possible to apply this substance for inside cooling of hollow synthetic material profiles during extrusion. Since these tools have temperatures from 150° C. to 180° C., and since, for reasons of design and construction, the boring in the extrusion tool for liquid nitrogen supply must not exceed 3 mm for boring lengths from 100 mm to 150 mm, it would be expected that the liquid nitrogen would evaporate while flowing through the tool, so that the hollow profile would only admit more or less cold gaseous nitrogen. However, by using, in accordance with the invention, undercooled liquid nitrogen in conjunction with a specially insulated capillary tube, the surprising result was that the major portion of the nitrogen enters the extruded hollow synthetic material profile in a liquid form.

THE DRAWINGS

DETAILED DESCRIPTION

Figure 1:
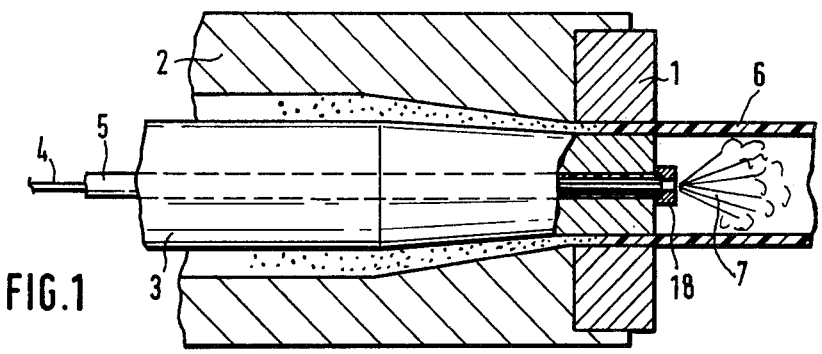
FIG. 1 is a cross-sectional view of the exit area of an extrusion tool in accordance with this invention.

The device represented in FIG. 1 shows the exit area of an extrusion tool consisting of the extrusion nozzle 1, the nozzle mount 2, and the arbor 3. According to the invention, a capillary tube 4 of PTFE with an inside diameter of 1 mm and an outside diameter of 2 mm is located inside the arbor 3. The maximum inside diameter of capillary tube 4 is 1.2 mm. The capillary tube 4 is surrounded by an insulation tube 5 of PTFE, which has an inside diameter of 2.2 mm and an outside diameter of 2.8 mm. The boring for accommodation of the capillary tube 4 and the insulation tube 5 has a diameter of 3 mm.

The maximum outside diameter of insulation tube 5 is 3 mm. The under-cooled liquid nitrogen 7, which is used as a cooling agent, flows through the capillary tube 4 and enters the extruded hollow synthetic material profile 6, to the greater part in liquid form. A nozzle 18, suitable for the nitrogen flow, may be attached to the exit end of the capillary tube 4. By means of this nozzle, the liquid nitrogen is atomized, whereby the evaporation rate and the cooling effect are increased.

As shown in FIG. 1, the space between tubes 4 and 5 is free of nitrogen.

Figure 2:
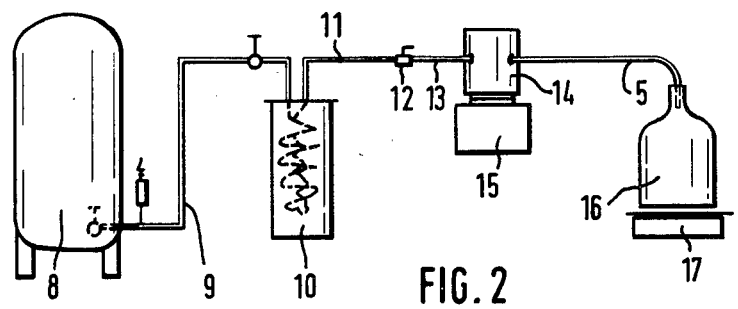
FIG. 2 illustrates a test installation for testing the procedure of this invention under varying working conditions.
Figure 3:
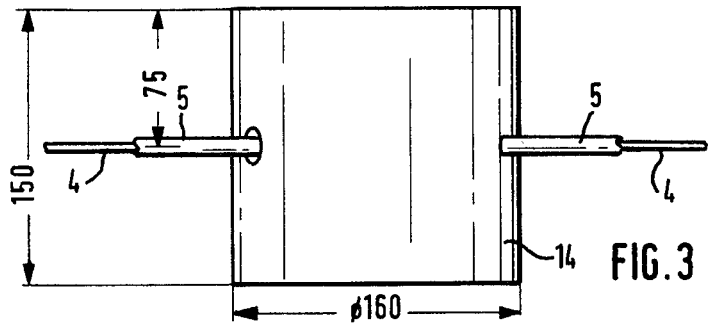
FIG. 3 is an elevation view of a portion of the test installation shown in FIG. 2.
Figure 4:
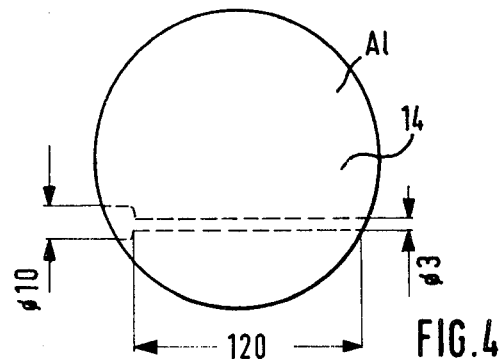
FIG. 4 is a top plan view of the portion shown in FIG. 3.

FIGS. 2 through 4 represent a test installation, by means of which the practical applicability of the procedure according to the invention was tested under varying working conditions. The liquid nitrogen was taken from the upright container 8 and led to the under-cooler 10 via a 10 m long, normalized line 9. The container pressure was between 3.3 and 5.3 bar. The heat added to the liquid nitrogen during the flow through the line was removed again in the under-cooler 10 by means of heat exchange with evaporating liquid nitrogen under atmospheric pressure. Thus, undercooled liquid nitrogen was available for the tests, and was transported via the insulated PA tubes 11 and 13 and the ball faucet 12 into the aluminum cylinder 14. The aluminum cylinder 14 simulated the extrusion tool. Details of its dimensions as well as the arrangement of the capillary tube according to the invention can be seen in FIGS. 3 and 4.

By means of a heating plate 15, the aluminum cylinder 4 was heated to the temperature desired in each test. According to the invention, the liquid nitrogen was led through the aluminum cylinder 14 via a capillary tube 4 which was encased in an insulation tube 5, and from the aluminum cylinder, it was introduced into the Dewar vessel 16. The liquid nitrogen captured in the Dewar vessel 16 was weighed on the table scale 17.

The capillary tube 4 had an inside diameter of 1 mm and an outside diameter of 2 mm. Capillary tubes 4 of PA-12, polyimide, and PTFE were studied. The insulation tube 5 consisted of PTFE and had an inside diameter of 2.2 mm and an outside diameter of 2.8 mm. Furthermore, comparison tests were performed with a capillary tube with 2 mm nominal diameter.

In general the tests showed the following. Only gaseous nitrogen passes through the capillary tube 4 without prior under-cooling. Furthermore, the insulation tube 5 is required for obtaining a sufficient through-flow of liquid nitrogen. PA is unsuitable as material for the capillary tube 4, since the tube will melt from the hot tool when the nitrogen supply is interrupted. Thus, polyimide and PTFE are preferred as materials for the capillary tube 4.

The test results are summarized in the following table:

| Tube (Inside $\phi$) | Temperature (°C.) | Pressure (bar) | Throughflow (kg/h) |
| --- | --- | --- | --- |
| 2mm | +20 | 5 | 131 |
| 2mm | +20 | 3.5 | 111 |
| 1mm | +20 | 5.3 | 30.6 |
| 1mm | +20 | 4.7 | 26.7 |
| 1mm | +100 | 4.4 | 18.5 |
| 1mm | +150 | 4.3 | 17.5 |
| 1mm | +200 | 3.3 | 14.25 |

The table shows that although the throughflow of the liquid nitrogen through the hot tool is less, compared with the flow through the cold tool, the major portion does, however, arrive in liquid form into the Dewar vessel 16 (or, into the hollow synthetic material profile 6).

Surprisingly, the temperature of the tool has no major effect on the quantity of the throughflow. According to pre-pressure (3-6 bar), 12 to 23 kg $LN_2/h$ can be transported through a capillary tube with a nominal width of 1 mm. Thus, the quantity can be regulated by means of the pressure or a valve for fine adjustment.

In practical application, the extruder performance was improved by 20% with the procedure according to the invention for a hollow profile with a specific weight of 360 g/m. The specific consumption of nitrogen in this case is 0.2 kg/kg product.

In summary, the invention results in intensifying the cooling and consequently increasing the rate of extrusion by using under-cooled liquid nitrogen as a cooling medium, which is introduced into the interior of the hollow synthetic material profile 6 by means of an insulated capillary tube 4, 5 which runs via the arbor 3 of the extrusion tool.

What is claimed is:

1. In a process for cooling hollow synthetic material profiles during extrusion by means of direct heat exchange with a cooling medium wherein the profiles are of small cross section, the process including the steps of
   (a) using under-cooled liquid nitrogen under a pressure of 2 to 8 bar as the cooling medium;
   (b) introducing the cooling medium into the interior of the hollow synthetic material profile;
   (c) supplying the cooling medium via a boring in the arbor of the extrusion tool;
   (d) forming as the cooling medium line a plastic capillary tube to and in the extrusion tool with the plastic being selected from the group consisting of polyimide and PTFE and with the capillary tube having a maximum inside diameter of 1.2 mm; and
   (e) enclosing the capillary tube in the insulation tube having a maximum outside diameter of 3 mm with the insulation tube outside diameter being of generally the same dimension as the arbor boring.

2. In an extrusion installation for extruding hollow synthetic profiles wherein the profiles are formed by an extrusion tube having an arbor and the profiles are of small cross section, a device for cooling the profiles during extrusion by means of direct heat exchange with a cooling medium, said device including a boring extending longitudinally through said arbor, an insulation tube having a maximum outside diameter of 3 mm being in said boring, said insulation tube outside diameter being of generally the same dimension as said boring, a capillary tube in said insulation tube and being open into the hollow interior of the profile, said capillary tube being made of a plastic material selected from the group consisting of polyimide and PTFE and having a maximum inside diameter of 1.2 mm, and means for supplying under-cooled liquid nitrogen into said capillary tube under a pressure of 2 to 8 bar.

3. The device of claim 2 wherein said insulation tube is made of PTFE.

4. The device of claim 3 including a nozzle arranged at the exit end of said capillary tube for purposes of atomizing the liquid nitrogen.

5. The device of claim 2 including a nozzle arranged at the exit end of said capillary tube for purposes of atomizing the liquid nitrogen.

6. The process of claim 1 wherein the profile is an uninflated window profile.

7. The process of claim 1 wherein a major portion of the cooling medium entering the profile is nitrogen in liquid form.

* * * * *